Patented May 8, 1951

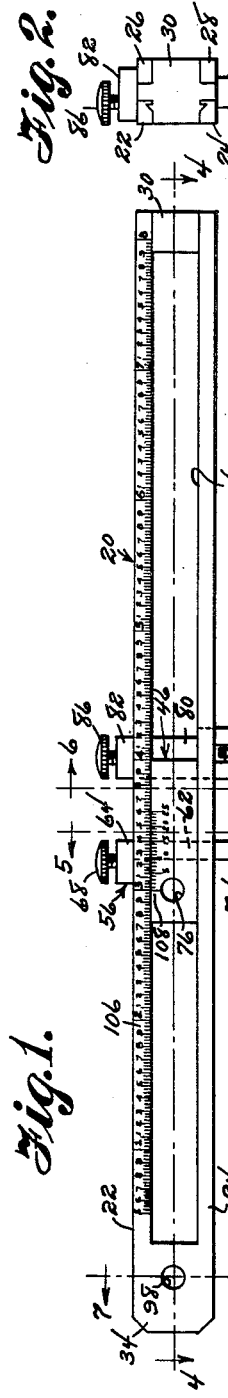

2,552,324

UNITED STATES PATENT OFFICE 2,552,324

MEASURING INSTRUMENT

Ray Kingsley, Atlanta, Ga.

Application November 16, 1945, Serial No. 629,059

2 Claims. (Cl. 33—159)

This invention relates to measuring instruments and more particularly to an instrument for measuring the distance from the center of one hole to the center of other relatively spaced holes.

An object of this invention is to provide an instrument that will measure the distance from center to center of various holes or openings without having to subtract or add various dimensions as is necessary when height gauges are used.

Another object of this invention is to provide an instrument that can be used for fittings, supports, brackets, jigs, fixtures, fabricated parts, etc., which are used in the manufacturing of airplanes, automobiles and machines or the like, where the exact measurement of the holes to be bored for fastening the above named articles is required.

Construction holes are made for a starting point from where all subsequent holes are located. With the instrument embodying the invention, a correct layout of the holes required can be rapidly achieved to very close measurements.

A further object of the invention therefore is the provision of an instrument that will rapidly and accurately lay out subsequent holes to be bored from a construction starting point to close readings of any distance within the length of the instrument.

With the above and other objects and advantages in view the invention consists of the novel details of construction and combination of parts hereinafter more fully described, claimed and illustrated in the accompanying drawing in which:

Figure 1 is an elevational view of an embodiment of the invention;

Figure 2 is an end view thereof;

Figure 3 is a top plan view thereof;

Figure 4 is a sectional view on the line 4—4 of Figure 1;

Figure 5 is a sectional view on the line 5—5 of Figure 1;

Figure 6 is a sectional view on the line 6—6 of Figure 1;

Figure 7 is a sectional view on the line 7—7 of Figure 1;

Figure 8 is a perspective view of the sliding gauge member, and;

Figure 9 is a perspective view of the vernier control for the sliding gauge member.

Referring more in detail to the drawing the reference numeral 20 designates the body or frame of the instrument embodying the invention.

The frame 20 comprises four relatively spaced longitudinally extending parallel bars 22, 24, 26, and 28 respectively, which are bridged at one point of their ends by a block 30.

The opposite ends are joined by an integral web 32 and extending in the opposite direction from the bars, forwardly of the web 32 and formed integrally therewith, are the relatively spaced projections 34 and 36 which are beveled as shown.

The bars are separated on the tops and bottoms thereof by longitudinal slots 38 and on their sides with longitudinal slots 40.

Bars 22 and 24 are provided on their inner sides with angular guideways 42 which are adapted to receive complementary shaped projections 44 formed integral with the sliding gauge member 46.

The member 46 comprises a flat gauge portion 48, a lateral foot portion 50, extending at right angles thereto and formed at right angles to the foot portion 50 is the upwardly extending toe portion 52.

This formation provides a recess 54 which is adapted to receive therein the I-shaped rider bar 56. The toe portion 52 is provided with a countersunk internally threaded opening 58 which is adapted to receive a screw 60 therein which when tightened will retain the vertical portion 62 of the bar 56 securely therein.

The top 64 of the bar 56 has sliding coaction with the top of the bars 22 and 26 and is provided adjacent one end thereof with an internally threaded opening 66 which is adapted to receive the complementary threaded setscrew 68.

The bottom portion 70 of the bar 56 has the adjusting screw 72 secured therein by means of a pin 74.

The gauge portion 48 is provided with a transverse opening 76, the purpose of which will be later explained.

A second I-shaped rider bar 78 is positioned in the frame 20 in like manner as is the bar 56.

The bar 78 comprises the vertical portion 80, the top portion 82 formed at right angles thereto, which is provided with the internally threaded opening 84 adapted to receive the complementary threaded setscrew 86 and like the rider bar 56 the top 82 of the bar 78 has sliding coaction with the bars 22 and 26, and the bottom or base 88 which extends outwardly on one side thereof to properly position oppositely positioned apertured ears 90.

The screw 72 extends through the apertured ears 90 and a knurled adjusting nut 92 is mounted on the screw intermediate the ears 90.

The purpose of the nut 92 will also be later explained.

The projections 34 and 36 are formed on their inner sides with dovetailed recesses 94 and 96 and the projections 34 and 36 are provided with openings 98 and 100 which lie at right angles to the recesses 94 and 96.

The dovetailed recesses 94 and 96 formed in the extension bars permit these bars to be added to the frame as desired.

The openings 98 and 100 are to receive the marking tool 102 or similar gauges having stems which will fit the openings 98 and 100.

The opening 76 in the gauge portion 48 is used in a similar manner with marking tool 104.

Gauge markings 106 are provided on the bar 22, which start from a point one-half inch from the center of the opening 98 and extend longitudinally of the bar 22 to the right of the opening 98.

These markings start at 5 and progress to 0 or the one inch point in divisions of ten between each inch, and from the one inch point they progress to the eight inch mark. The space between each inch mark is divided into 10 equal spaces as previously stated and each of these spaces is divided into four equal spaces representing twenty-five one thousandths of an inch.

On the gauge portion 48 the markings 108 will coact with the gauge markings 106 on the bar 22 in a similar manner as the gauge vernier of a height gauge.

This arrangement and coaction of the gauge markings permits readings in thousandths of an inch between points. The bars may be changed as to shape and size depending upon the requirements of the job to be done, and as stated bars of any length can be inserted in the dovetailed recesses 94 and 96 of the projections 34 and 36 to extend the length of the measuring instrument or connection may be made by other methods.

In operation the marking tool 102 is placed in the construction opening and the rider bar 78 is slid on the frame to a point approximately close to the position of a hole to be bored. The set screw 86 is tightened firmly fixing the bar 78 to the frame 20 then the nut 92 is turned sliding the gauge portion 48 forward or backward until the exact center of the hole to be bored is determined, then the marking tool 102 will be given a slight blow to mark the center of the new hole after the screw 68 has been tightened to fix the portion 48 in position. This operation is repeated until the centers of all the holes to be drilled have been determined.

Since the small scale markings 108 are divided into twenty-five spaces constituting twenty-four spaces on the large scale markings 106, the readings can be made in thousandths of an inch.

From the foregoing it will be seen that a very simple and compact form of measuring instrument has been provided, which is constructed to a high degree of accuracy for efficiently performing the objects of the invention.

The instrument in its entirety is made of light and durable metal, and it is to be understood that the structural details and combinations of the various parts are susceptible to variations and modifications as fall within the spirit of the invention and the scope of the appended claims.

Having thus described the invention what is claimed as new and desired to be secured by Letter Patent is:

1. In a measuring instrument having a frame provided with a plurality of relatively spaced longitudinally extending bars bridged at one end by a block and at their other end by a web to form outwardly extending parallel projections the improvement comprising, an elongated sliding gauge member mounted between two of said longitudinally extending bars, coacting guide means on said bars and said gauge members to retain said gauge member between said bars, gauge markings on one of said bars and gauge markings on said gauge member adapted to coact with the gauge markings on said bars, a foot portion on said gauge member extending from said gauge member in a plane perpendicular to the longitudinal axis of said gauge member, a toe portion extending from said foot portion in a plane perpendicular to the longitudinal axis of said foot portion and on said foot portion forming a recess between said toe portion and said gauge member, a rider slidably mounted on said bars and adapted to be received in the recess between said toe portion and said gauge member, means for fixing said toe portion to said rider, means carried by said rider for retaining said rider in fixed relation to said bars, a second rider slidably mounted on said bars, means carried by said second rider for retaining said second rider in fixed relation to said bars, and means carried by said rider to adjust said first rider and the gauge member fixed thereto so that the gauge markings on said bar and on said gauge member can be adjusted one with the other.

2. The invention as in claim 1 wherein the projections on said bars and the gauge member are provided with openings therein to receive marking tools to determine the centers of openings and the like.

RAY KINGSLEY.

REFERENCES CITED

The following references are of record in the file of this patent:

UNITED STATES PATENTS

| Number | Name | Date |
|---|---|---|
| 1,031,354 | Machava | July 2, 1912 |
| 1,402,629 | Manly | Jan. 3, 1922 |
| 1,786,325 | Young | Dec. 23, 1930 |
| 2,304,265 | Magyari | Dec. 8, 1942 |

FOREIGN PATENTS

| Number | Country | Date |
|---|---|---|
| 167,626 | Great Britain | Aug. 18, 1921 |

OTHER REFERENCES

Pub.: Keuffel & Esser Catalog, 37th Ed., page 298 January 1928.